July 11, 1961   D. E. GULICK   2,992,020
HOSE COUPLING
Original Filed Oct. 14, 1957
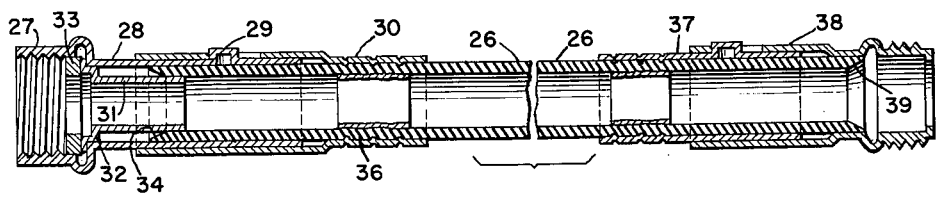
INVENTOR.
DAVID E. GULICK
BY
*Joseph F. Gulick*
ATTORNEY

2,992,020
HOSE COUPLING

David E. Gulick, 25090 Tepa Way, Los Altos, Calif.
Original application Oct. 14, 1957, Ser. No. 689,833, now Patent No. 2,907,591, dated Oct. 6, 1959. Divided and this application Oct. 1, 1959, Ser. No. 843,831

2 Claims. (Cl. 285—110)

This invention relates to hose couplings.

An object of the invention is to provide a coupling for attaching a garden, or similar hose, to a water spigot, or for attaching separate sections of a hose together and to provide means for readily attaching and detaching the sections.

A further more specific purpose is to provide a hose connection of such construction as to make it more practical, more convenient and more adaptable for use than devices heretofore known.

A still further object is to provide a hose coupling for the purpose indicated which by virtue of its simplicity will be inexpensive to construct and easy in operation.

This application is a division of my co-pending application Serial No. 689,833, filed October 14, 1957, for Hose Couplings now Patent No. 2,907,591, issued October 6, 1959.

In hose couplings heretofore known it has been difficult to connect the parts of a hose together when a hose is composed of separate sections. With my invention connections may be made simply and quickly. In my invention the connector is made of separable parts, one of which is connected to one end of a hose and the other part is connected to the end of another section of the hose. The parts of the connector are also separably connected by some convenient means, as by a bayonet connection. Such a connection is readily made and unmade with a very simple operation.

Further objects and advantages will become apparent from the description which follows and from the showings in the drawing, in which The sole figure shows a longitudinal sectional view of the coupling.

As shown in this figure separable connectors are secured to each end of a hose 26.

The threaded portion 27 of the member 28 may be connected to a water spigot, not shown. The member 28 carries a radial boss 29 which engages in a bayonet slot in the adjacent section 30. A tubular insert 31 having an enlarged end 32 seats in the threaded portion 27. The tubular insert extends into the end of the hose 26 and the end of the hose is beveled at 34 to effect a fluid seal. A conventional sealing washer 33 is positioned in the threaded end 27. The member 30 is secured on the hose by crimping as shown at 36.

The other end of the hose 26 is provided with a separable connector composed of members 37 and 38 similar to the members 28 and 30. In this portion of the connector the insert 31 is omitted since the hose is secured in the male member 37 and the end of member 38 is provided with the male threads of the connector. In this case also the end of the hose is beveled as shown at 39.

While preferred form of the invention has been specifically described it is to be understood that the invention is not limited to parts as specifically defined but only as called for in the appended claims.

I claim:

1. A hose coupling for joining contiguous ends of separate lengths of hose comprising a first sleeve member snugly fitting a hose end, an outwardly extending boss on said first sleeve member, a second sleeve member having an end portion adapted to telescopingly engage over said first sleeve member provided with a bayonet slot to removably engage said boss on said first sleeve member, a male threaded portion on said second sleeve member and an intermediate portion adapted to snugly receive said hose end, a third sleeve member provided with a female threaded portion for securement to said male threaded portion of said second sleeve member, said third sleeve member being provided with two coaxial tubular portions the outer of which is dimensioned to snugly receive a second hose end therein and is provided with an outwardly extending boss, and the inner of which is dimensioned to fit snugly within said second hose, and a fourth sleeve having an end portion provided with a bayonet slot adapted to snugly engage over said outer coaxial tubular portion with said boss entering said slot, said fourth sleeve having its other end snugly receiving said last-mentioned hose and means of securing said hose ends within said first and fourth sleeve members with said hose ends adapted to sealingly engage within said second and fourth sleeve members respectively.

2. The invention as defined in claim 1 in which the hose ends each have an outwardly beveled portion engaging within the walls of the said second and third telescoping sleeve members respectively.

References Cited in the file of this patent

UNITED STATES PATENTS

| 242,564 | Sholder | June 7, 1881 |
|---|---|---|
| 440,844 | Hallas | Nov. 18, 1890 |
| 523,583 | Lynch | July 24, 1894 |
| 864,618 | Deloche | Aug. 27, 1907 |
| 943,900 | Smith | Dec. 21, 1909 |
| 1,181,280 | Winter | May 2, 1916 |
| 1,212,817 | Russell | Jan. 16, 1917 |
| 2,047,714 | Smith | June 14, 1936 |
| 2,103,838 | Bach | Dec. 28, 1937 |
| 2,377,010 | Howard | May 29, 1945 |
| 2,421,228 | White | May 27, 1947 |
| 2,416,657 | Trevaskis | Feb. 25, 1947 |
| 2,733,940 | Millar | Feb. 7, 1956 |
| 2,907,591 | Gulick | Oct. 6, 1959 |